United States Patent [19]

Smith

[11] 4,039,142

[45] Aug. 2, 1977

[54] ELECTRIC LEAD INSERTION DEVICE

[76] Inventor: William Vernon Smith, 12928 Newhope St., Garden Grove, Calif. 92645

[21] Appl. No.: 771,232

[22] Filed: Feb. 23, 1977

[51] Int. Cl.² ........................................... E21C 29/16
[52] U.S. Cl. ..... 254/134.3 R; 254/134.3 FT;134.3 R; 324/51
[58] Field of Search ............... 254/134.3 R, 134.3 FT; 324/51

[56] References Cited

U.S. PATENT DOCUMENTS

| | | | |
|---|---|---|---|
| 1,639,889 | 8/1927 | Humm | 324/51 |
| 1,946,037 | 2/1934 | Scott | 254/134.3 R |
| 2,763,834 | 9/1956 | MacDonald et al. | 325/51 |
| 2,930,584 | 3/1960 | Hensley et al. | 254/134.3 R |
| 3,971,543 | 7/1976 | Shanahan | 254/134.3 R |

Primary Examiner—Robert C. Watson
Attorney, Agent, or Firm—John G. Mesaros

[57] ABSTRACT

An electric lead insertion device for feeding an electrical wire under carpeting or the like, the device including a blunt-nosed member having a toboggan-shaped cross section, the electrical lead having one end thereof secured to the member which is then inserted under one end of a carpet. A pointed metal probe is inserted through the carpet into contact with the member to displace the member under the carpet a distance determined by the length of the probe. The member location is manually noted, the probe reinserted and the member displaced an additional distance. The probe is provided with a pivotable handle containing an indicating lamp and a battery source which can be electrically connected to the other end of the electrical lead. With the probe and the member made of electrically conductive material a circuit is completed with the probe contacting the member to indicate its location.

11 Claims, 3 Drawing Figures

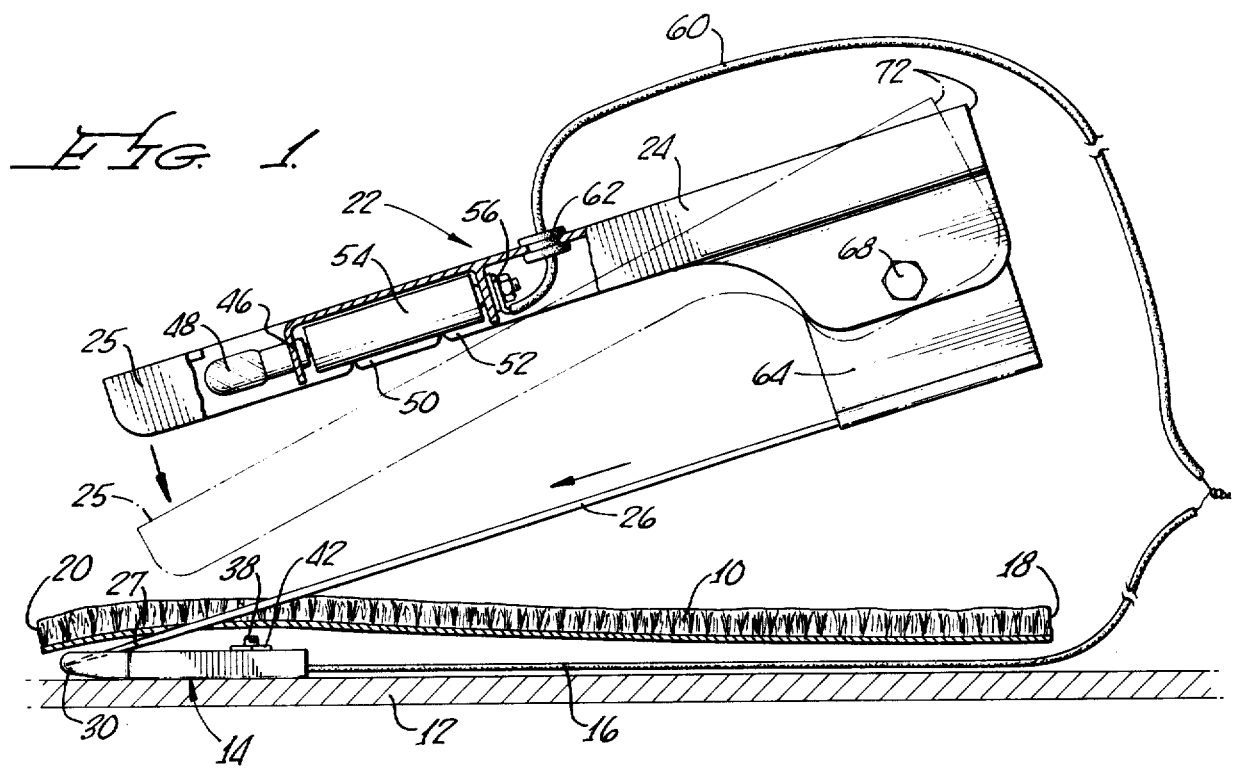
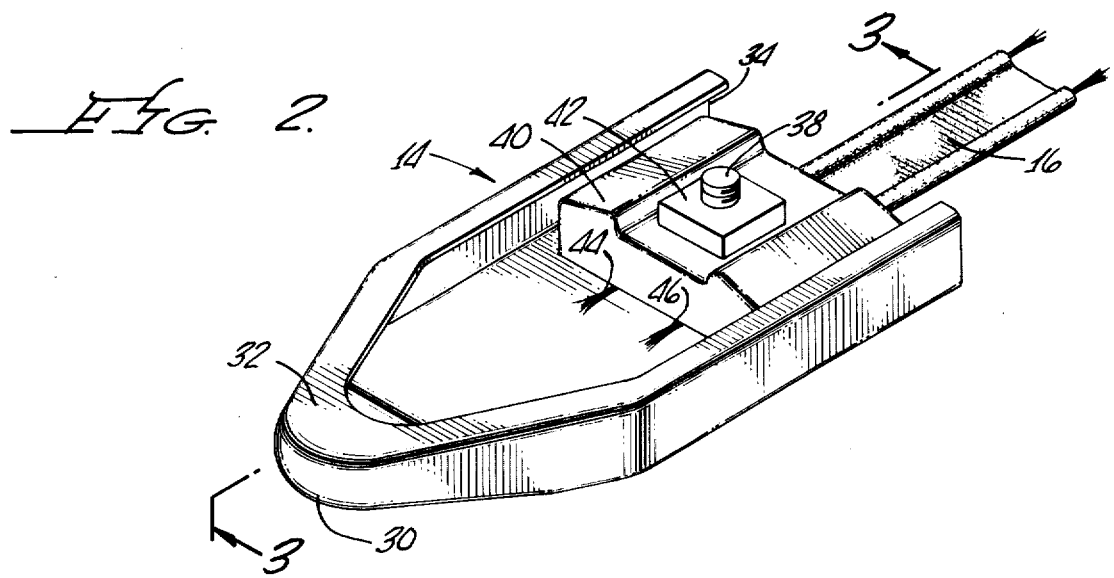
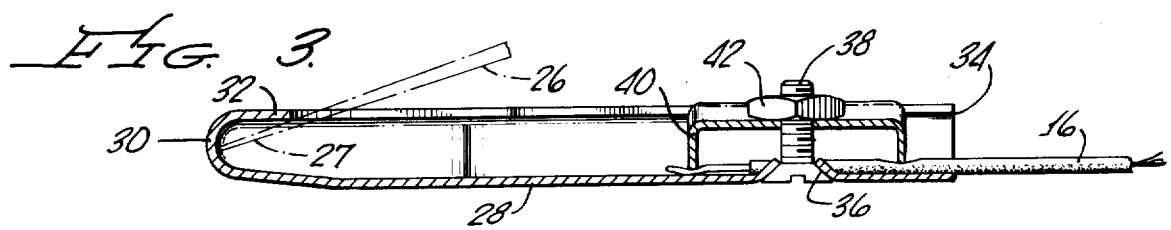

ELECTRIC LEAD INSERTION DEVICE

BACKGROUND OF THE INVENTION

The background of the invention will be discussed in two parts:

1. Field of the Invention

This invention relates to electrical lead insertion devices and more particularly to a device for inserting an electrical lead under a carpet or the like.

2. Description of the Prior Art

With the increasing use of electronic entertainment devices such as television sets and stereo sets a problem in created where the user desires to locate the electronic devices in certain parts of a room. For example, in houses of current construction, a television lead in wire terminates at a junction box on one wall of a room. If the owner of the home desires to place the television set on a wall across from the wall on which the junction box is located, the television antenna wire must be connected between the set and the junction box. Where the room has wall-to-wall carpeting, in some instances this has been accomplished by connecting the antenna wire at the junction box and then forcing the wire down between the carpeting and the adjacent baseboard around the periphery of the room to the is located. However, in many instances, this is not convenient since the periphery of the room may also include a portion of carpeting intersecting that of the room thereby requiring that a portion of the antenna wire be inserted under the carpet. In any event the route followed with the antenna wire is not the shortest or most direct route.

Similarly, when the owner has a stereo set and desires to place the speakers at locations remote from the amplifier cabinet, the amplifier must be electrically connected to the speakers thereby requiring connecting wires which become somewhat unsightly if placed above the carpeting.

Prior art devices for feeding wire have generally been directed to feeding wire through conduit and for this purpose an electric fish wire of the type shown in U.S. Pat. No. 1,946,037 has been routinely employed. However, such a device is not generally known to, or practical for, the average homeowner desiring to run an electrical lead under carpeting or the like. Furthermore, such a device cannot be readily employed to follow a serpentine path under a carpet, should a serpentine path be desired by the homeowner. Such a serpentine path or an irregular path can become necessary for example when it is desired to run leads under the wire from room to room, around door openings and the like which are real problems in an average home.

Accordingly, it is an object of this invention to provide a new and improved device for inserting an electrical lead under carpeting or the like.

It is another object of this invention to provide a new and improved electrical lead insertion device which can follow tortuous routes.

It is a further object of this invention to provide a new and improved electrical lead insertion device which can be electrically connected to the electrical lead for locating the portion to which the lead is connected.

SUMMARY OF THE INVENTION

The foregoing and other objects of the invention are accomplished by providing an electrical lead insertion device having a bodkin-like blunt-nosed member to which is secured one end of the electrical lead, the bodkin then being inserted under the carpet. A tool is provided with a pointed metal probe which is inserted through the carpet to engage a recurved portion of the bodkin for pushing the bodkin a distance determined by the length of the probe. The location of the bodkin is then manually marked with the probe re-inserted at that point to push the bodkin an additional distance. The process is repeated over any desired path until the electrical lead is at the desired location where it is pulled up around or through the carpet whereupon the spaced locations or devices are electrically connected. The tool is provided with a pivotable handle, for free end of which is spaced proximate to the tip of the probe for manually locating the tip when it is under the carpet and thereby facilitate the marking operation. The handle is also provided with an indicating lamp and battery power source which can be connected by means of a wire electrically to the other end of the electrical lead being inserted under the carpet. With the electrical lead electrically coupled to the bodkin made of conductive material, and the probe being made of metal and electrically connected to the lamp, the lamp is energized when the probe contacts the bodkin.

Further objects, features and advantages of the invention will become apparent from a reading of the specification when taken in conjunction with the drawings in which like reference numerals refer to like elements in the several views.

BRIEF DESCRIPTION OF THE DRAWINGS

FIG. 1 is a side elevational view of the electrical insertion device being used to install an electrical lead under a carpet;

FIG. 2 is a perspective view of the bodkin showing an electrical lead connected thereto; and FIG. 3 is a cross-sectional view of the bodkin of FIG. 2 taken along line 3—3 thereof.

DESCRIPTION OF THE PREFERRED EMBODIMENT

Referring now to the drawings and particularly to FIG. 1 there is shown a device for inserting an electrical lead such as the usual insulated television or FM antenna lead under a carpet 10, which in the usual home is laid over a surface 12. The surface 12 in the illustration of FIG. 1 can represent the floor or a carpet pad which is first laid over the floor prior to placing the carpet 10 thereon to provide additional insulation and resilience. In many instances of construction when a carpet pad is used it is often times bonded to the floor making it difficult to feed the electrical lead under the carpet pad. However, with a conventional twin-lead antenna wire or with a small diameter twinlead speaker wire the placement of the wire immediately beneath the carpeting does not provide any unsightly lines nor is it generally discernable to sight or touch. Consequently, although the instant device can be utilized to feed the electrical lead under the carpet padding if desired, the description will proceed with reference to placing the electrical lead under the carpet 10.

The device includes a member 14 in the shape of a bodkin to which is suitably secured the electrical lead 16 for feeding under the carpet 10 from one end 18 to an opposite location generally designated 20 which may be a location directly opposite the end 18 of carpet 10, or in some instances may be a location that requires that the lead 16 be laid out over a tortuous path. In either event since, as will hereinafter be described, the member 14 is fed in increments between the carpet 10 and the surface 12. The lead 16 can follow virtually any reasonable route.

The member 14 is manipulated by means of a tool generally designated 22 which includes a handle 24 and a pointed probe 26 secured thereto.

As better illustrated in FIGS. 2 and 3 the bodkin or member 14 has a generally toboggan-shaped cross section with a generally planar bottom surface 28 and a nose portion 30 having a recurved edge 32, the edge 32 extending generally about the periphery of the member 14 except for the rear portion 34. As can be seen in plan view of FIG. 2 the nose portion 30 is generally pointed with a blunt nose to facilitate the sliding of the member 14 between the surface 12 and the carpet 10. Additionally, the convergence of the periphery of edge 32 facilitates the insertion of the pointed probe 26 into engagement therewith. Dimensionally overall the member 14 is approximately 2½ inches long and about ¼ inch in height thereby providing a low profile to minimize the resistance of the member 14 in its movement. The bottom surface 28 is provided with an inwardly extending swaged opening 36 adjacent the rear 34 thereof, the opening 36 accepting the head of a screw 38 so that the screw head is flush with or spaced from the plane of the bottom surface 28. The screw 38 engages an inverted generally C-shaped clamp 40 which is provided on the bight portion thereof with a nut 42 which can be intergral with or secured to clamp 40. As best illustrated in FIG. 3, the tightening of the screw 38 to the nut 42 of clamp 40 secures a suitable electrical lead 16 to the member 14. In the illustration shown the electrical lead 16 is a twin-lead antenna wire which is contained in suitable insulation with the leads 44 and 46 thereof in spaced parallel relation within the insulation. As shown, the antenna lead 16 is stripped so that the conductive lead portions 44 and 46 are positioned on either side of screw 38 with the leads 44 and 46 being secured in electrically conductive relation to the metallic member 14 by means of clamp 40.

Referring again to FIG. 1 the lead 16 has the insulation from the other end thereof suitably stripped to expose the bare conductive metal for reasons which will hereinafter be described. The handle 24 of tool 22 is generally hollow and in the described embodiment is formed of sheet metal suitably bent to form a housing within handle 24. Adjacent the free end 25 of handle 24 within the housing so formed a lamp socket 46 is secured for receiving an indicating lamp 48. Immediately behind socket 46 the handle 24 is configured to provide a clip 50 centrally located with respect to a battery receiving portion 52 containing a battery 54 therein with one end thereof abutting against lamp 48. Immediately behind the battery compartment 52 within the housing formed in the handle 24 a fiber washer 56 is secured within the housing, the fiber washer, in conventional fashion, having a centrally disposed metal contact for engaging the other end of battery 54. Electrically connected to the metal contact is an insulated wire conductor 60 extending out through an aperture having a rubber grommet 62 therein formed in the top of handle 24. The other end of conductor 60 has the insulation suitably stripped therefrom for a distance of 1 to 3 inches to expose the bare conductor which is then electrically connected to the bare wire of the other end of lead 16. With the pointed probe 26 made of electrically conductive material, the probe 26 has the end opposite point 27 thereof spot welded to a metallic plate 64 which is then secured to handle 24 by means of a suitable bolt 68 to create a pivotal connection between handle 24 and probe 26 which is also electrically complete from the socket 46 to the point 27 of probe 26.

By means of the above-described construction of tool 22 the free end 25 of handle 24 is spaced from and in proximate location to the point 27 which, as can be seen with the tool 22 engaging the member 14 would correspond also to the location of member 14 beneath the carpet. The overall length of handle 24 is generally co-extensive with or slightly smaller than the length of probe 26, and in its unpivoted condition the handle 24 is generally parallel to probe 26. With the metallic construction of the handle 24, the metallic plate 64, the probe 26 and the member 14 when the point 27 of probe 26 engages the member 14 an electrical series circuit is completed by means of the electrical lead 16, the wire conductor 60, the battery and the indicating lamp 48 to thereby illuminate lamp 48 when probe 26 is in contact with member 14.

Although the indicating lamp 48 and the electrical components associated therewith are not absolutely necessary, a problem frequently arises where, due to the size of the member 14, its position cannot be readily detected if the carpet 10 is a plush carpet or a heavy shag which would make the member 14 less discernable to touch. In such a situation by merely inserting the point 27 of probe 26 at various points within the general area as soon as the point 27 of probe 26 contacts member 14 the indicating lamp 48 will be energized.

In the embodiment shown and described the probe 26 can be for example in the form of a knitting needle of approximately 10 inches in length with the handle 24 being slightly shorter. The connection of handle 24 to the metallic plate 64 by means of pivot 68 is such that when the handle 24 is gripped to move the probe 26 in the direction indicated by the arrow adjacent thereto, the handle 24 is lifted slightly until the inner edge of the rear portion 72 thereof abuts against the upper edge of metallic plate 64 thereby holding handle 24 in generally parallel alignment with probe 26. After the probe 26 has been used to slidably move the member 14 a distance determined by the length of probe 26, the free end 25 of handle 24 can then be pivoted downwardly toward the carpet 10 to facilitate marking of the location of member 14.

In operation the device is used in the following manner. A given end of an electrical lead 16 is suitably stripped to expose bare metal conductors 44 and 46. The bare metal conductors 44 and 46 of lead 16 are then suitably clamped to the member 14 by means of the screw 38 and clamp 40 to provide an electrical connection between lead 16 and member 14. The member 14 is then inserted under one end of a carpet 10 in sliding relation with a surface 12 immediately beneath carpet 10. The other end of the electrical lead 16 has the insulation thereof suitably stripped to expose bare metal which is then twist wrapped to the other end of the exposed bare metal of wire conductor 60 of tool 22. The probe 26 is then inserted through the carpet 10 immediately above member 14 until the point 27 of probe 26 engages the nose portion 30 of member 14 between the recurved edge 32 and the bottom 28 thereof (as illustrated in dotted lines in FIG. 3). The tool 22 is gripped by the handle 24 and pushed in the desired direction indicated by the arrow adjacent member 14 whereby moving the member 14 approximately 10 inches or the distance determined by the length of probe 26. During this movement with the point 27 engaging the nose 30 of member 14 the indicating lamp 48 will be illuminated thereby verifying contact between member 14 and tool 22. Then, the free end 25 handle 24 is pivoted toward the carpet with the free end 25 generally locating a point on member 14 slightly forward of the center thereof. This point is marked by placing a finger on the carpet 10. The probe 26 is then withdrawn and re-inserted at the somarked point indicated by the finger. If the point 27 of probe 26 passes through carpet 10 and engages member 14 the indicating lamp 48 will again be energized thereby verifying the location of member 14. The free end 25 of handle 24 is essentially a locator to assist in the repeated operation required to move the member 14 along with lead 16 to the desired destination. With a generally flat lead such as a television lead, as the electrical lead 16 is being fed under the carpet 10 care must obviously be exercised to maintain lead 16 in a flat position to keep it from twisting.

Although in the described embodiment the handle 24 of tool 22 has been referred to as constructed of sheet metal it is to be understood that plastic can be utilized to provide a molded handle of aesthetically pleasing appearance. However, with a plastic handle containing an indicating lamp 48 and a battery compartment 52 a second electrical conductor must be added to provide the electrical connection required with the probe 26. By utilization of the device described an electrical lead 16 can be inserted under a carpet or the like in a straight line or in a curved line between two points within a given room with virtually no displacement of the carpet except at the entrance end and the exit end of lead 16. Moreover, due to the small size of the bodkin or member 14 which is approximately 1 inch wide, 2½ inches long and ⅛inch high, the opening required for insertion of the member 14 would be very small thus, also making it possible to remove the lead 16 through a slit in the carpet 10 which slit would not be discernable should the lead 16 thereafter be removed.

While there has been shown and described a preferred embodiment it is to be understood that various other adaptations and modifications may be within the spirit and scope of the invention.

What is claimed is:

1. In a device for inserting and feeding a lead or the like under a carpet or the like, the combination comprising:

A member having a recurved nose portion for feeding under a carpet and clamp means on said member for securing one end of a lead thereto; and a tool having a pointed probe for inserting through the carpet, the point of the probe being adapted for engaging the recurved nose portion of said member, said tool having a handle portion secured to said pointed probe for grasping said handle and displacing said member under the carpet a distance determined by the length of said probe.

2. The combination according to claim 1 wherein said tool further includes locating means spaced from and generally parallel to said pointed probe and having a length generally coextensive with the length of said probe whereby to mark the point of said probe after said probe is inserted through the carpet.

3. The combination according to claim 1 wherein said probe is made of electrically conductive material, at least said nose portion of said member is made of electrically conductive material and said clamp means electrically connect one end of an electrical lead to said nose portion, and said tool includes an indicating lamp and other means for electrically connecting said probe to the other end of said electrical lead to energize said lamp when the point of said probe contacts said nose portion.

4. The combinatin according to claim 2 wherein said locating means is a portion of said handle.

5. The combination according to claim 4 wherein said handle is pivotally connected to said probe at the end thereof opposited said point, the free end of said handle being pivotal toward the carpet whereby to mark the location of said point and said member.

6. The combination according to claim 5 wherein said pointed probe is made of an electrically conductive material and at least said nose portion of said member is made of electrically conductive material and said clamp means electrically connect one end of an electrical lead to said nose portion, said tool including a signal lamp and other means for electrically connecting said probe to the other end of said electrical lead to energize said indicating lamp when the point of said probe contacts said nose portion of said member.

7. The combination according to claim 6 wherein said handle includes said indicating lamp and a battery retaining portion for energizing said lamp.

8. The combination according to claim 7 wherein said handle is generally hollow and is provided with clip means for retaining the battery therein.

9. The combination according to claim 8 wherein said member is made of an electrically conductive material and said clamp means is a metallic clamp secured to said member by a screw, said clamp being configured to engage a conductive portion of said electrical lead for clamping the same to said member.

10. The combination according to claim 9 wherein said other means includes a flexible length of wire having one end secured within said handle for electrically connecting to said battery and the other end of said wire being adapted for electrically connecting to the other end of said lead.

11. The combination according to claim 10 wherein said member is configured with an edge converging toward said nose portion whereby to direct said probe into said nose portion.

* * * * *